Jan. 26, 1937. J. BALTON 2,069,026

BAKING PLATE

Filed Oct. 1, 1935 2 Sheets-Sheet 1

Inventor
JAMES BALTON

By Albert E. Dieterich
Attorney

Jan. 26, 1937. J. BALTON 2,069,026
BAKING PLATE
Filed Oct. 1, 1935 2 Sheets-Sheet 2

Inventor
JAMES BALTON
By Albert E. Dieterich
Attorney

Patented Jan. 26, 1937

2,069,026

UNITED STATES PATENT OFFICE 2,069,026

BAKING PLATE

James Balton, Baltimore, Md., assignor of one-fourth to Joseph Shapiro, Baltimore, Md., one-fourth to Isaac Shapiro, Chicago, Ill., one-fourth to Samuel Shapiro, and one-fourth to Nathan Shapiro, both of Chelsea, Mass.

Application October 1, 1935, Serial No. 43,090

4 Claims. (Cl. 53—10)

My invention relates to the art of pastry making, and more especially to the manufacture of rolled sugar ice cream cones. In making sugar cones of the type in which the cone is baked as a flat wafer and then, while hot and pliable, rolled into form around a conical mandrel difficulty has been experienced in detaching the baked wafer from the baking plates.

It has been the custom to bake the wafers between flat plates having suitable ornamentation in the form of grooves on each plate in order to give the wafer a pleasing appearance. When baking machines are employed which contain a large number of baking plate sets it has been quite a problem to insure uniformity of operation, and different means have been employed for loosening the wafers from the plates to effect the discharge of the baked wafers therefrom. It has been the object, more or less accomplished in all devices heretofore used for the purpose, to have the wafers always adhere to one mold plate in the same uniform way, i. e., all wafers to remain on the bottom plate or all to remain on the top plate as the plates are separated.

An object of the present invention is to insure the wafers being always competely detached from the bottom plate and only partially detached from the top plate by the opening movement of the baking plates.

Further, it is an object of the invention to provide a wafer of such construction, and to provide a pair of baking plates therefor, so that the wafers will all be caused to adhere in part preferably to the top mold plate and be wholly stripped from preferably the bottom plate as the plates separate in order that a portion of the wafer will be loosened and detached from the top plate to provide a convenient portion to be grasped by the fingers of the attendant's hands (or by automatic devices, if desired), thus allowing the wafer to be easily peeled from the top plate. This method insures uniformity of action at all times.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 1:
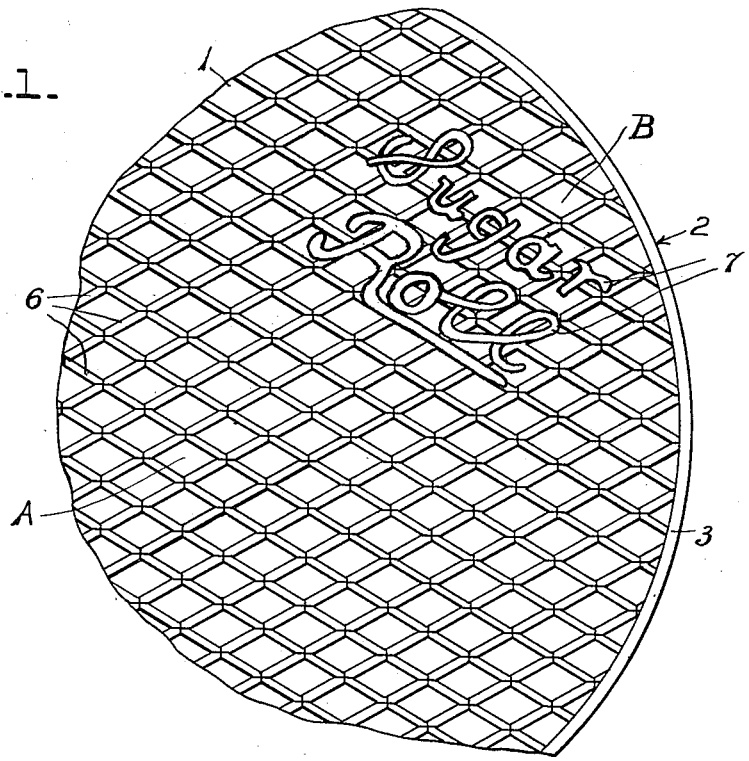
Figure 1 is a plan view of that face of the wafer which constitutes the outside of a finished cone.

In the drawings, in which like numerals and letters of reference indicate like parts in all of the figures, 1 represents the baked wafer which has that edge 2 constituting the mouth of the rolled cone reinforced by a rib 3.

On the outer face the wafer is provided with suitable ornamentations composed, in the illustration, of criss-crossed beads or shallow ribs 6, preferably of a definite "mesh", while the inner face likewise has criss-crossed beads or shallow ribs 4. The beads 4 and 6 are preferably of the same "mesh" so that, so far as the beads 4 and 6 are concerned, each face of the wafer will have approximately the same amount of surface area. In order, however, that the wafer may be uniformly held on and be detached in part from the upper baking plate 11, when the plates 11 and 14 are separated, I provide that portion of the wafer's inner face (upper face, in baking position) which lies remote from the mouth edge 2 with additional beads 5 in order that the portion of the wafer adjacent the point of the cone will have a greater surface area at that place than it has adjacent the rim 2. The trade name 7 is molded on the outer face of the wafer adjacent the rim (the outer face of the wafer being the face baked downwardly) so as to provide the outer face adjacent the rim with a greater surface area than the remainder of the face. This greater surface area of the outer face of the wafer is less, however, than that portion of the inner face of the wafer which is remote from the rim. In other words, the portion A which is ornamented alone by the criss-crossed beads 6 and that A' which is ornamented alone by the criss-crossed beads 4 on the opposite face are approximately of the same surface area, while the portions B and B' are of greater surface area than the portion A and A'; the portion B' is of greater surface area than that of the portion B.

The baking plates comprise, generally, a lower plate 14 having the necessary grooves 8 to form the criss-crossed beads 6 and a groove 10 to form the mouth bead 3 at the rim of the wafer. The upper plate 11 has criss-crossed grooves 12 to form the beads 4, and additional grooves 13 to form the beads 5. The plates are hinged together at 15 and the lower plate has a shoulder 10 which is preferably slightly undercut and forms the smooth edge 2 of the wafer.

Figure 2:
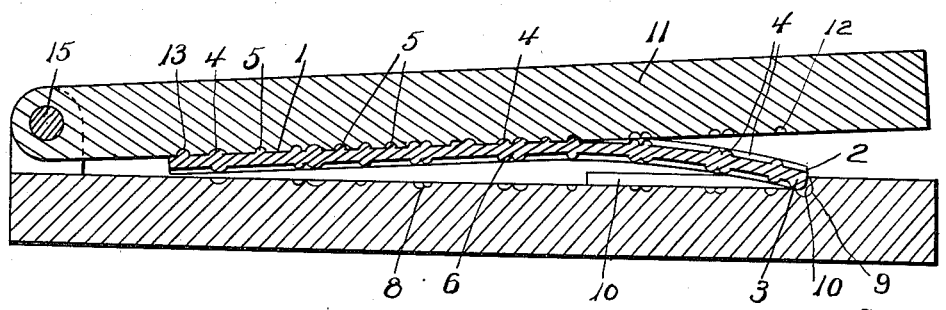
Figure 2 is a central vertical section of a pair of baking plates for baking the wafers, the plates being partially separated or opened to show the method of detaching the wafer therefrom.
Figure 3:
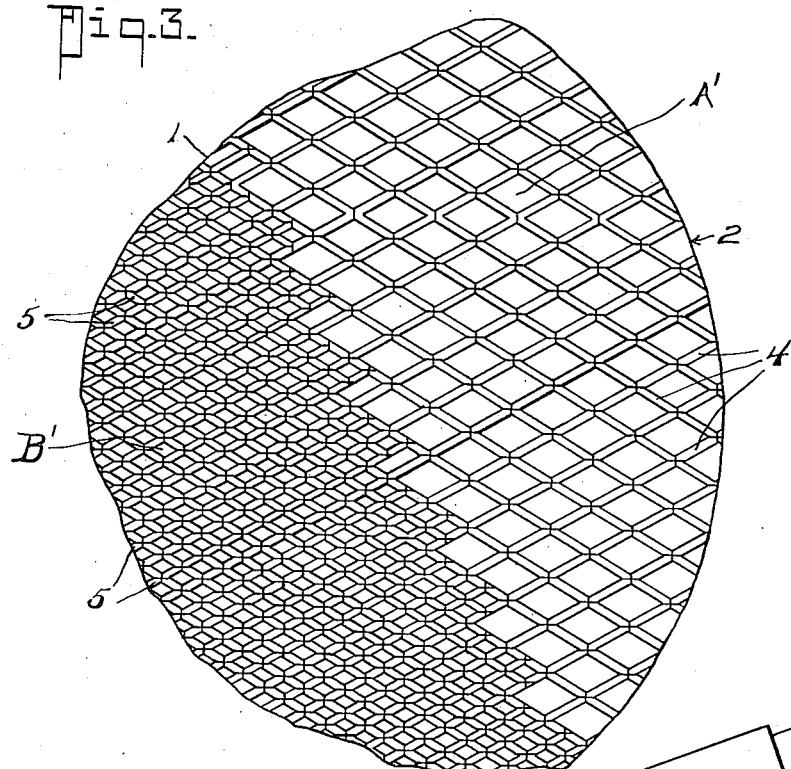
Figure 3 is a plan view of the other face of the wafer, the face which is on the inside of a finished cone.
Figure 4:
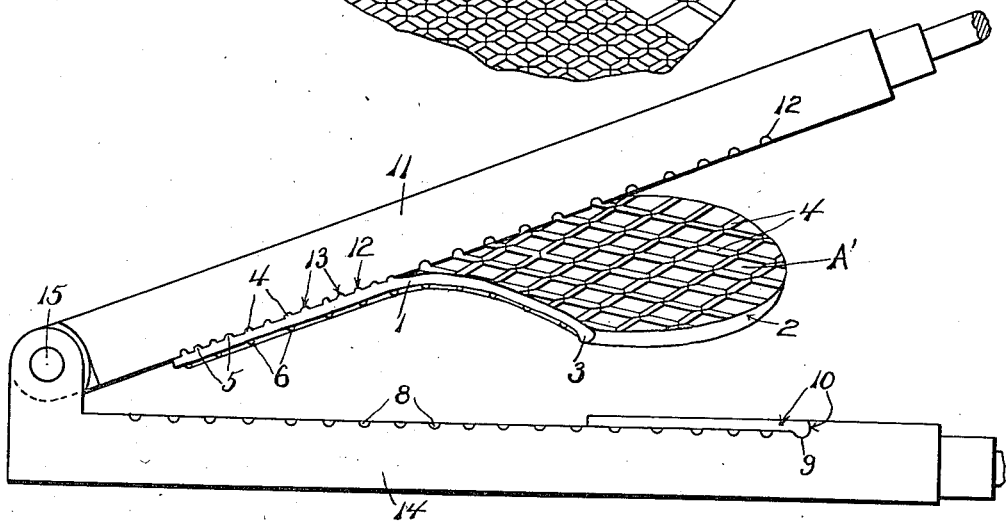
Figure 4 is a side elevation of a pair of baking plates opened sufficiently so that the wafer is entirely stripped from the lower plate, and partially stripped from the upper plate, in order that it may be grasped and pulled entirely off.

The face of the wafer which is to become the outside of the cone is baked by the lower plate, while the face which is to become the inside of the cone is baked by the upper plate. Thus it will be seen that as the plates are separated or opened, the area B' will adhere most tenaciously to the plate 11, while, at the beginning of the separation of the plates, the bead 3 and the area B hold the area B of the wafer temporarily to the lower plate in order to effect a separation of a part of the wafer portion A' from the top plate (see Figures 2 and 4). This construction makes it unnecessary to provide the baking plates with special attachments to hold the wafer thereto, and it makes it easy for the attendant to grasp the beaded end of the wafer and strip it from the top plate 11, or to employ automatic machinery for the purpose.

From the foregoing description, taken in connection with the accompanying drawings, it is thought that the complete construction, operation and advantages of the invention will be clear to those skilled in the art to which it appertains.

What I claim is:

1. A pair of wafer baking plates hinged together, one plate having a surface containing grooves to provide two surface portions of different surface areas, the greater area being remote from the hinged end of the plate, the other plate having a surface containing grooves to provide two surface portions of different surface areas, the greater area being adjacent the hinged end of the plate, the several areas of the plates being co-related so that upon separation of the plates the wafer will become wholly detached from one plate and only partially detached from the other plate substantially as and for the purposes described.

2. A pair of wafer baking plates hinged together, one plate having a surface containing grooves to provide two surface portions of different surface areas, the greater area being remote from the hinged end of the plate, the other plate having a surface containing grooves to provide two surface portions of different surface areas, the greater area being adjacent the hinged end of the plate, and the surface area of the greater-area portion of the top plate being in excess of the greater-area portion of the bottom plate, the several areas of the plates being co-related so that upon separation of the plates the wafer will become wholly detached from one plate and only partially detached from the other plate for purposes described.

3. In combination, a pair of baking plates hinged together, the total surface area of one plate being greater than that of the other plate to insure a detachment of the baked wafer from said other plate while the wafer remains adhering to the first plate, a portion of the face area of said other plate having a greater surface area than the opposed portion of the first plate whereby when said plates are separated a portion of the wafer adhering to the first plate will be detached from said first plate.

4. A pair of wafer baking plates hinged together, each of said plates having a baking surface of two differently tenacious areas, the areas of lesser tenacity of the plates lying one adjacent the hinge and the other remote from the hinge, the area of greater tenacity of one plate being in excess of that of the other plate, in virtue of all of which when the plates are separated the wafer will become completely detached always from a certain one of the plates and detached from the less tenacious area only of the other plate, for purposes described.

JAMES BALTON.